United States Patent
Arai

(10) Patent No.: US 12,311,613 B2
(45) Date of Patent: May 27, 2025

(54) METHOD OF JOINING RESIN MEMBERS

(71) Applicant: ZEON CORPORATION, Tokyo (JP)

(72) Inventor: Kunihito Arai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 52 days.

(21) Appl. No.: 18/261,482

(22) PCT Filed: Feb. 24, 2022

(86) PCT No.: PCT/JP2022/007701
§ 371 (c)(1),
(2) Date: Jul. 14, 2023

(87) PCT Pub. No.: WO2022/181713
PCT Pub. Date: Sep. 1, 2022

(65) Prior Publication Data
US 2024/0075694 A1    Mar. 7, 2024

(30) Foreign Application Priority Data
Feb. 26, 2021    (JP) .................................. 2021-030784

(51) Int. Cl.
*B29C 65/48*    (2006.01)
*B29C 65/02*    (2006.01)

(52) U.S. Cl.
CPC .......... *B29C 65/4895* (2013.01); *B29C 65/02* (2013.01)

(58) Field of Classification Search
CPC ... B29C 65/02; B29C 66/71; B29L 2031/756; B29K 2033/12

(Continued)

(56) References Cited

U.S. PATENT DOCUMENTS 5,195,240 A * 3/1993 Shuster ................. F28F 21/065
264/516
6,074,510 A * 6/2000 Tachibana .............. B41J 2/1637
156/290

(Continued)

FOREIGN PATENT DOCUMENTS

| JP | 2005080569 A | 3/2005 |
| JP | 2013099867 A | 5/2013 |
| WO | 2009131070 A1 | 10/2009 |

OTHER PUBLICATIONS

Aug. 29, 2023, International Preliminary Report on Patentability issued in the International Patent Application No. PCT/JP2022/007701.

(Continued)

*Primary Examiner* — Philip C Tucker
*Assistant Examiner* — Brian R Slawski
(74) *Attorney, Agent, or Firm* — KENJA IP LAW PC

(57) ABSTRACT

Disclosed is a method of joining resin members that includes: forming a coating layer by applying a solvent to a surface of a resin member, the solvent allowing the thermoplastic resin to have a degree of swelling of 1.05 or more and 3.00 or less when the thermoplastic resin is swollen by the solvent, and having a boiling point B° C. of R ° C. or lower where R ° C. is a glass transition temperature of the thermoplastic resin; laminating resin members one another via the coating layer to form a laminate; and pressing the laminate in the lamination direction while heating at a heating temperature H ° C. that is equal to or lower than R ° C.

4 Claims, 1 Drawing Sheet

(58) Field of Classification Search
USPC ... 156/60, 292, 305, 308.2, 308.6, 309.6, 83
See application file for complete search history.

(56) References Cited

U.S. PATENT DOCUMENTS

| | | | |
|---|---|---|---|
| 7,390,377 B1* | 6/2008 | Wallow | B29C 66/9592 |
| | | | 156/308.6 |
| 8,535,789 B2 | 9/2013 | Maruno et al. | |
| 9,150,411 B2 | 10/2015 | Okawa et al. | |
| 2007/0015179 A1 | 1/2007 | Klapperich et al. | |
| 2011/0272093 A1* | 11/2011 | Zhou | B29C 66/543 |
| | | | 156/292 |
| 2012/0077260 A1 | 3/2012 | Sharon et al. | |
| 2013/0115728 A1* | 5/2013 | Okawa | B81C 3/001 |
| | | | 216/13 |

OTHER PUBLICATIONS

Apr. 19, 2022, International Search Report issued in the International Patent Application No. PCT/JP2022/007701.
Dec. 16, 2024, the Extended European Search Report issued by the European Patent Office in the corresponding European Patent Application No. 22759748.1.

* cited by examiner

METHOD OF JOINING RESIN MEMBERS

TECHNICAL FIELD

The present disclosure relates to a method of joining resin members.

BACKGROUND

In recent years, structures composed of plate-shaped resin members which are joined together, such as microfluidic chips, for example, have been attracting attention.

A microfluidic chip is a chip-like structure including microfluidic channels and reaction vessels on the order of micrometer formed using microfabrication technology. Microfluidic chips are used in various fields such as analyses and testing of biological materials such as DNA, RNA, and proteins, drug discovery and pharmaceutical development, organic synthesis, and analyses of water qualities. In addition, microfluidic chips which are made of a resin and can be manufactured at low cost are attracting attention as microfluidic chips.

Various methods of manufacturing microfluidic chips made of resin have been studied. For example, PTL 1 discloses a method of joining microchips. In the method, on a substrate having microfluidic channels formed on the surface thereof, an organic solvent is coated on a portion without channels of the substrate, a substrate to serve as a lid is overlapped, and the substrates are joined together. In addition, PTL 2 discloses the joining two substrates made of a cycloolefin polymer or a cycloolefin copolymer via an adhesive layer containing paraffin or naphthene.

CITATION LIST

Patent Literature

[PTL 1] JP 2005-080569 A
[PTL 2] WO 2009/131070 A1

SUMMARY

Technical Problem

In cases where resin members are joined together according to conventional joining methods described above, there is a risk of deformation or external appearance defects occurring on substrates during joining. Also in the conventional joining methods, there is also a risk of residue of a solvent in a joined portion.

It is, therefore, an object of the present disclosure to provide a method of joining resin members which can prevent a solvent from remaining in a joined portion when resin members are joined together, and also prevent deformation and external appearance defects of the resin members composing a joined article.

Solution to Problem

The prevent inventor has made a diligent study to solve the above problem. As a result, it has been newly discovered that a solvent is prevented from remaining in a joined portion, and resin members are less likely to be deformed or have external appearance defects by selecting, as a solvent used for joining, a solvent that has a boiling point equal to or lower than the glass transition temperature of a thermoplastic resin forming the resin members and allows the thermoplastic resin to have a degree of swelling that falls within a predetermined range when the resin is swollen by the solvent, and performing a step of heating and pressing when the resin members are joined together via a coating layer formed from such a solvent, thereby completing the present disclosure.

In other words, an object of the present disclosure is to advantageously solve the above problem, and a method of joining resin members of the present disclosure is a method of joining at least two resin members comprising a thermoplastic resin, the method comprising: forming a coating layer by applying a solvent to a surface of at least one of the resin members, the solvent allowing the thermoplastic resin to have a degree of swelling of 1.05 or more and 3.00 or less when the thermoplastic resin is swollen by the solvent, and having a boiling point B° C. of R ° C. or lower where R ° C. is the glass transition temperature of the thermoplastic resin; laminating the at least two resin members one another via the coating layer to form a laminate; and pressing the laminate in the lamination direction while heating at a heating temperature H ° C. that is equal to or lower than R ° C. A solvent is prevented from remaining in a joined portion and deformation and external appearance defects of the resin members are prevented by selecting, as a solvent used for joining, a solvent that has a boiling point equal to or lower than the glass transition temperature of a thermoplastic resin forming the resin members and that allows the thermoplastic resin to have a degree of swelling that falls within a predetermined range when the resin is swollen by the solvent, and performing a step of heating and pressing when the resin members are joined together via the coating layer formed from such a solvent.

Here, the "degree of swelling" of a thermoplastic resin when the thermoplastic resin is swollen by a solvent can be measured according to the method described in the EXAMPLES section in the specification. In addition, the "glass transition temperature" of a thermoplastic resin can be measured according to the method described in the EXAMPLES section in the specification. Furthermore, the "boiling point" of a solvent refers to the boiling point thereof at 1 atm.

In the method of joining resin members, at least one of the at least two resin members may be a transparent resin member. Furthermore, in the method of joining resin members, both of the at least two resin members may be transparent resin members.

In the joining method between resin members, the heating temperature H ° C. in the heating and pressing is preferably (R−20)° C. or lower. When the heating temperature H ° C. in the heating and pressing is lower than the glass transition temperature R ° C. of the thermoplastic resin by 20° C. or more, even better prevention of deformation of the resin members can be achieved.

Furthermore, the method of joining resin members preferably includes preheating the laminate at a temperature of (B+25)° C. or lower between the laminating and the heating and pressing. When the laminate is preheated in a temperature range not exceeding the boiling point of the solvent B° C.+25° C. before the heating and pressing, an even better joining of the resin members can be achieved.

Advantageous Effect

According to the present disclosure, it is possible to provide a method of joining resin members which can prevent a solvent from remaining in a joined portion when resin members are joined together and can also prevent deformation and external appearance defects of the resin members composing a joined article.

DETAILED DESCRIPTION

Figure 1A:
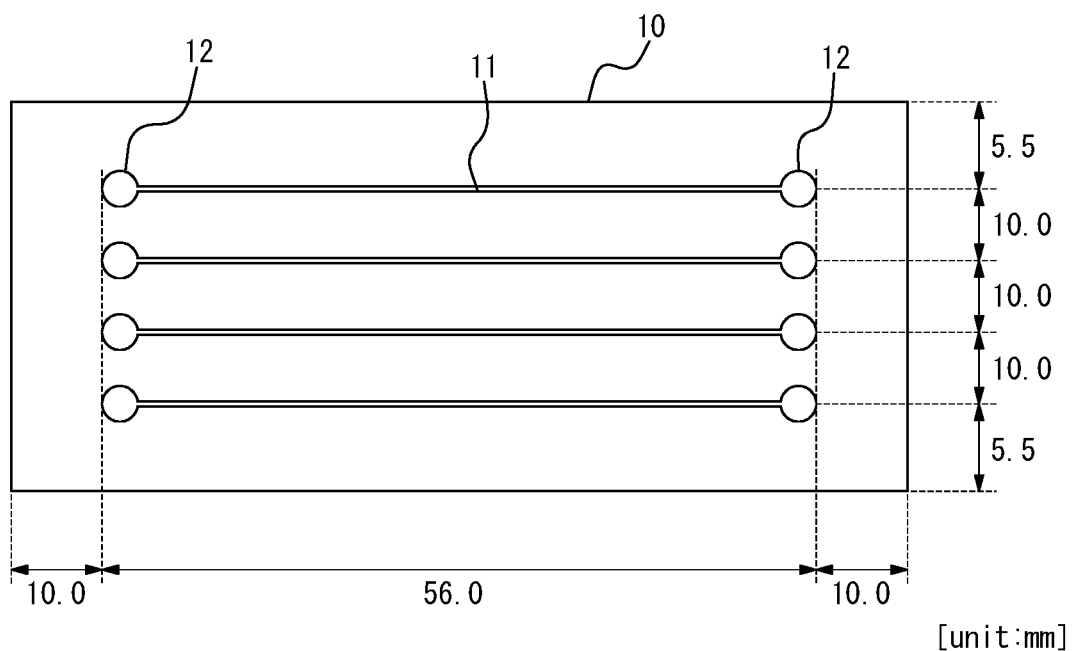
FIG. 1A is a plan view of one example of a channel substrate of microfluidic chips produced in Examples and Comparative Examples.

Hereinafter, one example of an embodiment of the present disclosure will be described in detail. Here, a joined article obtained through a method of joining resin members of the present disclosure can be widely used in the medical field, the field of biotechnology, and the field of optics, and specifically can be distributed as microfluidic chips and well plates.

(Method of Joining Resin Members)

A method of joining resin members is a method of joining at least two resin members comprising a thermoplastic resin, the method comprising: a coating layer formation step of forming a coating layer by applying a solvent to a surface of at least one of the resin members, the solvent allowing the thermoplastic resin to have a degree of swelling of 1.05 or more and 3.00 or less when the thermoplastic resin is swollen by the solvent, and having a boiling point B° C. of R° C. or lower where R° C. is the glass transition temperature of the thermoplastic resin; a lamination step of laminating the at least two resin members one another via the coating layer to form a laminate; and a heating and pressing step of pressing the laminate in the lamination direction while heating at a heating temperature H° C. that is equal to or lower than R° C. In the joining method of the present disclosure, a solvent is prevented from remaining in a joined portion of a joined article obtained, and deformation and external appearance defects of the resin members composing the joined article are prevented by selecting, as a solvent used for joining, a solvent that has a boiling point equal to or lower than the glass transition temperature of the thermoplastic resin forming the resin members and that allows the thermoplastic resin to have a degree of swelling that falls within a predetermined range when the resin is swollen by the solvent, and performing a step of heating and pressing when the resin members are joined together via the coating layer formed from such a solvent.

<Thermoplastic Resin>

Examples of the thermoplastic resin that can form the resin members to be joined by the joining method of the present disclosure include, but are not limited to, cyclic olefin resins, polycarbonate resins, aromatic polyetherketone resins, and (meth)acrylic resins. These can be used alone or in combination of two or more of these. Of these, the thermoplastic resin is preferably a cyclic olefin resin, as it exhibits advantageous properties such as precision moldability, low water absorption, low birefringence, and low fluorescence. As used herein, "(meth)acrylic" means acrylic or methacrylic.

Cyclic olefin resins are, for example, polymers or copolymers produced through polymerization of monomers to be described below, or hydrides thereof. The cyclic olefin polymer can be crystalline or amorphous, but amorphous olefin polymers are preferred. Monomers that can be used to form the repeating units of the cyclic olefin polymer are preferably norbornene-based monomers. Norbornene-based monomer is a monomer containing a norbornene ring. Examples of the norbornene-based monomer include bicyclic monomers, such as bicyclo[2.2.1]hept-2-ene (conventional name: norbornene), 5-ethylidene-bicyclo[2.2.1]hept-2-ene (conventional name: ethylidene norbornene), and their derivatives (those with substituents on the ring); tricyclic monomers such as tricyclo[5.2.1.0$^{2,6}$]deca-3,8-diene (conventional name: dicyclopentadiene) and derivatives thereof; and tetracyclic monomers such as tetracyclo[7.4.0.0$^{2,7}$.1$^{10,13}$]tetradeca-2,4,6,11-tetraene (conventional name: methanotetrahydrofluorene), tetracyclo[6.2.1.1$^{3,6}$.0$^{2,7}$]dodeca-4-ene (conventional name: tetracyclododecene), 9-ethylidene tetracyclo[6.2.1.1$^{3,6}$.0$^{2,7}$]dodeca-4-ene, and derivatives of these. These monomers may have substituents at any position. In addition, the cyclic olefin polymer may be an addition polymer, a ring-opening polymer, or a hydride thereof, but the cyclic olefin polymer is preferably a ring-opening polymer or a hydride of a ring-opening polymer.

The glass transition temperature R° C. of the thermoplastic resin is preferably 125° C. or higher, and more preferably 130° C. or higher in view of application to steam sterilization. When the glass transition temperature R° C. of the thermoplastic resin is equal to or higher than the above lower limit, even better prevention of deformation of the resin members composing a resulting joined article can be achieved.

<Resin Members>

The resin members to be joined contain the thermoplastic resin described above as the main component and may contain additives such as antioxidants where it is deemed necessary. The content ratio of the thermoplastic resin in the resin members is not particularly limited, and the content ratio of the thermoplastic resin may be 90 mass % or more or the thermoplastic resin may be contained in a ratio of 100 mass %. At least one of the at least two resin members to be joined may be a transparent resin member, or both of these may be transparent resin members. Here, a resin member being "transparent" in the present disclosure means that the total light transmittance measured by a turbidimeter (NDH300A manufactured by NIPPON DENSHOKU INDUSTRIES Co., Ltd.) according to the method of JIS K7105 is 80% or more. The resin members may have been subjected to a surface treatment such as hydrophilic treatment, or the resin members may not have been subjected to a surface treatment.

<Solvent>

Examples of the solvent include those that satisfy at least the following two conditions:

1) The degree of swelling of the thermoplastic resin forming the resin members when the thermoplastic resin is swollen is 1.05 or more and 3.00 or less; and
2) The solvent has a boiling point (B° C.) equal to or lower than the glass transition temperature (R° C.) of the thermoplastic resin forming the resin members.

With regards to the condition 1) above, the degree of swelling is preferably 1.20 or more, more preferably 1.30 or more, even more preferably 1.50 or more, and is preferably 2.80 or less, and more preferably 2.50 or less. By using a solvent that allows the thermoplastic resin that forms the resin members to have a degree of swelling that is equal to or greater than the above lower limit when the thermoplastic resin is swollen by the solvent, an even better joining of the resin members can be achieved. In addition, by using a solvent that allows the thermoplastic resin that forms the resin members to have a degree of swelling that is equal to or less than the above upper limit when the thermoplastic resin is swollen by the solvent, deformation of the resin members after being joined together can be effectively prevented.

With regards to the condition 2) above, the boiling point B° C. of the solvent is preferably (R−10) ° C. or lower, more preferably (R−20) ° C. or lower, and even more preferably (R−40) ° C. or lower. As mentioned above, "R° C." means the glass transition temperature of the thermoplastic resin that forms the resin members. When the boiling point B° C. of the solvent is equal to or lower than the above upper limit, the amount of residual solvent remaining in a resulting joined article can be reduced. In cases where the plurality of resin members to be joined are made of different thermoplastic resins, the solvent is selected based on the glass transition temperature of the thermoplastic resin having the lowest glass transition temperature to be used as "R° C.". In addition, in cases where the solvent is a mixed solvent, the solvent is selected such that the average boiling point weighted by the mixing ratio satisfies the above condition 2). Residual solvent in a joined article is undesirable because it may cause outgassing when the joined article (e.g., microfluidic chip) is used. The lower limit of the boiling point B° C. of the solvent is not particularly limited and can be 30° C. or higher, for example.

The solvent used can be selected appropriately to satisfy the above conditions 1) and 2) in relation to the thermoplastic resin that forms the resin members. For example, in cases where the cyclic olefin resin (ZEONEX® 690R (ZEONEX is a registered trademark in Japan, other countries, or both), glass transition temperature: 136° C.) which was used in Examples to be described below is used as a thermoplastic resin, tetrahydrofuran (degree of swelling: 1.58, boiling point: 65° C.), tetrahydropyran (degree of swelling: 2.15, boiling point: 88° C.), 2-methyltetrahydrofuran (degree of swelling: 1.76, boiling point: 80.2° C.), and 1-hexene (degree of swelling: 1.41, boiling point: 63° C.) can be used as the solvent. Of these, tetrahydrofuran, tetrahydropyran, and 2-methyltetrahydrofuran are preferred as the solvent.

<Coating Layer Formation Step>

In the coating layer formation step, a solvent is applied to the surface of at least one of the resin members to form a coating layer, where the solvent allows the thermoplastic resin to have a degree of swelling of 1.05 or more and 3.00 or less when the thermoplastic resin is swollen by the solvent, and the solvent has a boiling point B° C. of R° C. or lower (where R° C. is the glass transition temperature of the thermoplastic resin). The coating layer may be formed on the surfaces of both of the two adjacent resin members so that the coating layers are in contact with each other when the resin members are laminated, or may be formed on one of the two adjacent resin members when the resin members are laminated. In particular, in cases where the joined article to be produced is a microfluidic chip or other structure that includes a groove structure formed thereon, it is preferable that the coating layer is not formed on the side of a substrate having the groove structure (i.e., a channel substrate of a microfluidic chip) but only on the side of a substrate without a groove structure (i.e., a lid substrate of a microfluidic chip).

For example, in cases where the joined article to be produced is a microfluidic chip, the width, the depth, and the shape of a microfluidic channel provided on the channel substrate can be modified as appropriate for the application of the microfluidic chip. However, in general, the width and the depth are on the order of millimeters or smaller, although they may be on the order of nanometers, the order of micrometers is preferred. Specifically, the width of the fine channel is not limited, and can be, for example, 10 μm or more and 800 μm or less.

For example, in cases where the joined article to be produced is a microfluidic chip, the lid substrate can be a substrate with a smooth surface that can be used to cover the flow channel substrate and optionally with a through hole that serves as an inlet for a sample or other material into the microfluidic channel of the flow channel substrate when the lid substrate is formed into a microfluidic chip together with the flow channel substrate. The lid substrate is then joined to the channel substrate, the smooth side serving as the joined surface. Note that a substrate with a micro channel formed on the opposite side of the smooth surface which is to be joined to the channel substrate may be used as the lid substrate.

The amount of the solvent applied to the surface of the resin member in the coating layer formation step is preferably 0.5 mg/cm 2 or more, more preferably 1.0 mg/cm 2 or more, even more preferably 2.0 mg/cm 2 or more, and is preferably 10.0 mg/cm 2 or less, and more preferably 5.0 mg/cm 2 or less. When the application amount is equal to or more than the above lower limit, an even better joining of the resin members can be achieved. In addition, when the application amount is equal to or less than the above upper limit, an even better prevention of the occurrence of external appearance defects such as white turbidity and cracks in a resulting joined article can be achieved.

<Lamination Step>

In the lamination step, the above at least two resin members are laminated one another via the coating layer to form a laminate. In cases where the joined article to be produced is a microfluidic chip, the channel substrate, and the lid substrate are laminated so that the smooth surface of the lid substrate faces the surface of the channel substrate having a channel formed thereon.

<Preheating Step>

In the preheating step which may optionally be performed, the above laminate is preheated at a temperature of (B+25) ° C. or lower. In the preheating step, the laminate is preferably preheated without being pressed. The preheating temperature in the preheating step is preferably (B+15) ° C. or lower. As described above, "B° C." is the boiling point of the solvent at 1 atm. When the preheat temperature is equal to or lower than the above upper limit, an even better joining of the resin members can be achieved. Note that the lower limit of the preheating temperature can be 30° C. or higher, for example.

In addition, the preheating time in the preheating step can be 10 seconds or longer and 120 seconds or shorter, for example. When the preheating time is within the above range, an even better joining of the resin members can be achieved.

The specific mode of performing the preheating step is not limited. For example, when the heating and pressing step to be described below is performed using a flat plate press apparatus, the preheating step can be performed by setting the temperature of the lower heating plate of the flat plate press apparatus to the preheating temperature and placing the laminate on the lower heating plate. As a matter of course, it is also possible to perform the preheating step using a preheating furnace set to the preheating temperature, for example.

<Heating and Pressing Step>

In the heating and pressing step, the laminate is pressurized in the lamination direction while heating at a heating temperature H° C. which is equal to lower than R° C. The heating temperature H° C. is preferably (R−10) ° C. or lower and more preferably (R−20) ° C. or lower, and is preferably 20° C. or higher and more preferably 40° C. or higher. When the heating temperature H ° C. is equal to or lower than the above upper limit, the occurrence of deformation of a resulting joined article can be effectively prevented. When the heating temperature H° C. is equal to or higher than the above lower limit, the occurrence of external appearance defects such as white turbidity and cracks in a resulting joined article can be prevented more effectively. Note that, in the case where the resin members to be joined are made of different thermoplastic resins, the heating temperature H° C. is determined based on the glass transition temperature of the thermoplastic resin having the lowest glass transition temperature to be used as "R° C.".

The pressure to be applied in the heating and pressing step is preferably 0.1 MPa or higher, more preferably 0.3 MPa or higher, even more preferably 0.5 MPa or higher, and is preferably 10 MPa or lower, more preferably 5.0 MPa or lower, and even more preferably 3.0 MPa or lower. When the pressure to be applied in the heating and pressing step is equal to or more than the above lower limit, it is possible to prevent the occurrence of insufficient joining between the resin members and to achieve an even more better joining of the resin members. When the pressure to be applied in the heating and pressing step is equal to or lower than the above upper limit, the deformation of a resulting joined article can be prevented more effectively.

The pressing time in the heating and pressing step is preferably 1 second or longer, more preferably 10 seconds or longer, less preferably 10 minutes or shorter, and more preferably 5 minutes or shorter. When the pressing time is set to be equal to or longer than the above lower limit, an even better joining of the resin members can be achieved. When the pressing time is set to be equal to or shorter than the above upper limit, the deformation of a resulting joined article can be prevented more effectively.

The heating and pressing step can be performed using any means or apparatus without particular limitation. Examples of such means or apparatus include, for example, an apparatus equipped with means to press the laminate between flat plates (hereinafter referred to as flat plate press apparatus), a roll press apparatus, and placing the laminate sealed in a vacuum bag in an autoclave followed by heating and pressing. Of these, it is preferable to perform the heating and pressing step using a flat plate press apparatus from the viewpoint of the production efficiency and quality improvement of the resulting laminate. Note that the heating temperature in the case of heating and pressing using a flat plate press apparatus and a roll press corresponds to the heating temperature H° C., which is the highest temperature of the temperatures of multiple press plates and multiple press rolls used in the heating and pressing step.

EXAMPLES

The present disclosure will now be described below based on examples. However, the present disclosure is not limited to the examples disclosed herein.

<Measurement and Evaluation Method of Physical Properties>

Physical properties were measured and evaluated according to the following methods.

<Measurement Method of Degree of Swelling>

A test specimen having a size of 10×10×0.5 mm was prepared for a measurement of the degree of swelling using the same thermoplastic resin used to form resin members used in each of Examples and Comparative Examples. Based on JIS K 7114:2001, a test specimen for a measurement of the degree of swelling was immersed in 2 mL of a solvent for 24 hours at 23° C., and the ratio of the mass before and after the immersion (mass after immersion/mass before immersion) was calculated. When a specimen was completely dissolved after the immersion or a specimen could not maintain the shape thereof and could not be removed, the result was determined to be "dissolved".

(Measurement Method of Glass Transition Temperature)

The glass transition temperature (R) was measured using a differential scanning calorimeter (product name: DSC 6220 SII, manufactured by Nanotechnology) at a temperature increase rate of 10° C./minute according to JIS K7121.

(External Appearance Defect)

The appearance of each sample prepared in Examples and Comparative Examples was visually observed to check for the presence or absence of cracks in the channel substrate and the lid substrate, as well as defects such as white turbidity in the channel portion or the joined portion, and evaluated according to the following criteria.

A: Crack, white turbidity, or other external appearance defects were not observed.

B: Crack of 2 mm or less or white turbidity were observed only at the end portions.

C: Cracks or white turbidity were observed in a manner that did not meet the criterion of the B rating.

(Joining State)

A liquid feed test was conducted to evaluate the joining state of resin members in a joined article obtained in Examples and Comparative Examples according to the following procedure.

An ink solution was injected into each channel of the microfluidic chip of each sample prepared in Examples and Comparative Examples from the inlet by means of a pressure-controlled pulseless flow pump P-Pump (manufactured by Takasago Fluidic Systems). The outlet side had been sealed with a silicone rubber. The pumping pressure was increased to 650 kPa and held for 3 minutes. The joined article was then visually checked to determine the presence or absence of diffusion of the ink solution from the channels to the joined portion and the evaluation was made according to the following criteria.

A: No leakage or diffusion was observed in the pumping test.

B: Leakage or diffusion was observed in the pumping test.

C: Peeling occurred during handling in the pumping test.

(Deformation State)

Five unjoined channel substrates were prepared. The average cross-sectional area S0 of each channel which was cut orthogonally to the channel at the center, and the average cross-sectional area S1 of each channel which was cut orthogonally to the channel at the center of each produced sample were measured under a field emission scanning electron microscope ("SU8220", manufactured by Hitachi High-Tech Corporation). The channel shape retention ratio was then calculated according to the formula below and evaluated according to the following criteria.

Channel shape retention ratio (%)=$S1/S0 \times 100$

A: 95% or more

B: 90% or more and less than 95

C: 80% or more and less than 90

D: Less than 80

(Residual Solvent)

Test pieces having a size of 5×5 mm cut out from the center of a channel substrate and a lid substrate which were unjoined, and a test piece having a size of 5×5 mm cut out from the center of each sample prepared according to the same procedure as in each of Examples and Comparative Examples were tested using a thermogravimeter-differential thermal analyzer ("STA7200", manufactured by Hitachi High-Tech Science Corporation). The mass loss was measured when the samples were heated to 350° C. (the measurement conditions are as follows). The average value W0 (ppm) of the mass loss of the unjoined flow channel substrate and lid substrate specimens, and the mass loss W1 (ppm) of the specimen of each sample were determined. From the difference between W1 and W0, the amount of residual solvent was calculated, and was evaluated according to the following criteria.

Measurement Conditions

Atmosphere: Nitrogen
   Temperature increase rate: 10° C./min.
   Starting temperature: 20° C.
   Holding time duration at 350° C.: 1 hour Evaluation Criteria
   A: Less than 10 ppm
   B: 10 ppm or more and less than 100 ppm
   C: 100 ppm or more Example 1

<Preparation of Channel Substrate and Lid Substrate>

Pellets of a resin containing monomer units derived from norbornene-based monomer ("ZEONEX 690R", manufactured by Zeon Corporation, glass transition temperature: 136° C.) as a cyclic olefin resin were dried at 110° C. for 5 hours. Thereafter, the pellets were injection molded according to a usual method in an injection molding machine (FANUC ROBOSHOT® (ROBOSHOT is a registered trademark in Japan, other countries, or both) α100B, manufactured by FANUC CORPORATION) at a resin temperature of 280° C. and a mold temperature of 100° C. under a holding pressure of 80 MPa to obtain flow channel substrates and lid substrates. The thickness of each substrate (for the channel substrate, the thickness of the portions where no channels were formed) was 2 mm.

The channel substrates obtained by the injection molding were channel substrates 10 having four channels 11 (width: 100 μm, depth: 100 μm) having end portions 12 at both ends on one surface, as illustrated in FIG. 1A.

Figure 1B:
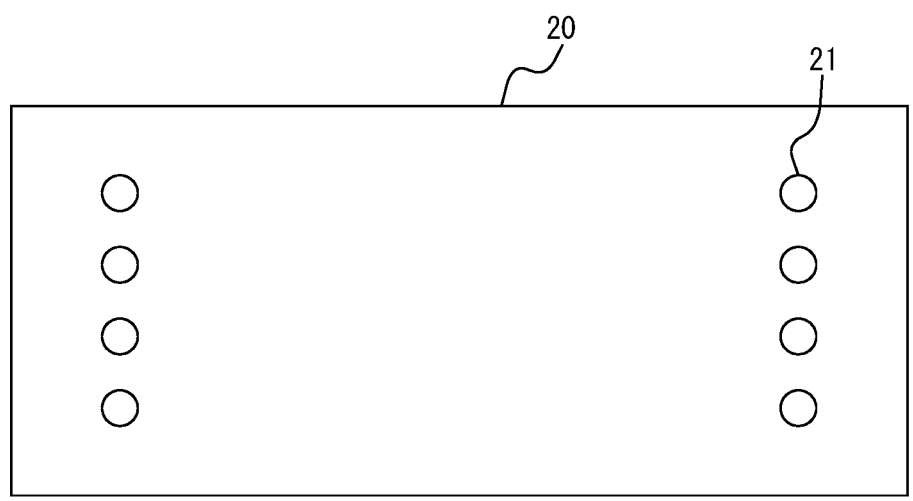
FIG. 1B is a plan view illustrating one example of a lid substrate of the microfluidic chips produced in Examples and Comparative Examples.

The lid substrates obtained by the injection molding were lid substrates 20 having eight through holes 21 (inlets) of 2.0 mm in diameter, as illustrated in FIG. 1B. The locations of the through holes 21 corresponded to the end portions 12 of the channels 11 of the channel substrate 10.

<Coating Layer Formation Step>

On one side of the lid substrate obtained according to the above, 50 μL of tetrahydrofuran (the boiling point at 1 atm: 65° C.) as a solvent was applied to the entire surface to form a coating layer. The specific gravity of tetrahydrofuran was 0.88, and the application amount was 2.2 mg/cm².

<Lamination Step>

A flow channel substrate and a lid substrate were laminated one another to form a laminate such that the side of the flow channel substrate having the flow channels formed thereon contacted the side of the lid substrate having the coating layer applied thereon. In the laminate, the channel substrate and the lid substrate were adjacent to each other via the coating layer interposed.

<Preheating Step>

The lower heating plate of a vacuum pressing apparatus ("VS30-3030", manufactured by Mikado Technos), which was a flat plate press apparatus, was heated to 30° C., and the laminate formed as described above was placed on the lower heating plate such that the lid substrate side faced the lower heating plate. Here, the boiling point B° C. of tetrahydrofuran as the solvent was 65° C., and the temperature of the lower heating plate, 30° C. was thus equal to (B−35)° C. The preheating time was 30 seconds.

<Heating and Pressing Step>

Prior to the heating and pressing step, the upper heating plate of the vacuum heat pressing apparatus was also heated to 30° C. Then, 30 seconds after the start of the preheating step, heating and pressing of the laminate was initiated by the upper heating plate. The heating and pressing time was 2 minutes and the pressure applied was 1 MPa.

The measurements and evaluations were performed on a microfluidic chip, i.e., the resulting joined article, according to the above procedures. The results are summarized in Table 1.

Example 2

Operations, measurements, and evaluations were performed in the same manner as in Example 1, except that the temperature settings of the upper heating plate and the lower heating plate of the vacuum heat pressing apparatus were changed to 60° C. The results are summarized in Table 1.

Example 3

Operations, measurements, and evaluations were performed in the same manner as in Example 1, except that the temperature settings of the upper heating plate and the lower heating plate of the vacuum heat pressing apparatus were changed to 80° C. The results are summarized in Table 1.

Example 4

Operations, measurements, and evaluations were performed in the same manner as in Example 1, except that tetrahydropyran was used instead of tetrahydrofuran as the solvent and the temperature settings of the upper heating plate and the lower heating plate of the vacuum heat pressing apparatus were changed to 80° C. The results are summarized in Table 1.

Example 5

Operations, measurements, and evaluations were performed in the same manner as in Example 4, except that the temperature settings of the upper heating plate and the lower heating plate of the vacuum heat pressing apparatus were changed to 100° C. The results are summarized in Table 1.

Example 6

Operations, measurements, and evaluations were performed in the same manner as in Example 1, except that 2-methyltetrahydrofuran was used instead of tetrahydrofuran as the solvent and the temperature settings of the upper heating plate and the lower heating plate of the vacuum heat pressing apparatus were changed to 80° C. The results are summarized in Table 1.

Example 7

Operations, measurements, and evaluations were performed in the same manner as in Example 1, except that the temperature settings of the upper heating plate and the lower heating plate of the vacuum heat pressing apparatus were changed to 90° C. The results are summarized in Table 1.

Example 8

Operations, measurements, and evaluations were performed in the same manner as in Example 1, except that the temperature settings of the upper heating plate and the lower heating plate of the vacuum heat pressing apparatus were changed to 100° C. and 60° C., respectively. The results are summarized in Table 1.

Example 9

Operations, measurements, and evaluations were performed in the same manner as in Example 1, except that tetrahydropyran was used instead of tetrahydrofuran as the solvent, and the temperature settings of the upper heating plate and the lower heating plate of the vacuum heat pressing apparatus were changed to 120° C. and 80° C., respectively. The results are summarized in Table 1.

Comparison Example 1

Operations, measurements, and evaluations were performed in the same manner as in Example 1, except that cyclohexane was used instead of tetrahydrofuran as the solvent and the temperature settings of the upper heating plate and the lower heating plate of the vacuum heat pressing apparatus were changed to 80° C. The results are summarized in Table 1.

Comparison Example 2

Operations, measurements, and evaluations were performed in the same manner as in Example 1, except that acetone was used instead of tetrahydrofuran as the solvent and the temperature settings of the upper heating plate and the lower heating plate of the vacuum heat pressing apparatus were changed to 50° C. The results are summarized in Table 1.

Comparison Example 3

Operations, measurements, and evaluations were performed in the same manner as in Example 1, except that hexadecane was used instead of tetrahydrofuran as the solvent and the temperature settings of the upper heating plate and the lower heating plate of the vacuum heat pressing apparatus were changed to 110° C. The results are summarized in Table 1.

Comparison Example 4

Operations, measurements, and evaluations were performed in the same manner as in Example 1, except that cyclohexanone was used instead of tetrahydrofuran as the solvent and the temperature settings of the upper heating plate and the lower heating plate of the vacuum heat pressing apparatus were changed to 140° C. The results are summarized in Table 1.

Note that, in Table 1,
"THF" denotes tetrahydrofuran, and
"THP" denotes tetrahydropyran.

TABLE 1

| | | Example 1 | Example 2 | Example 3 | Example 4 | Example 5 | Example 6 | Example 7 |
|---|---|---|---|---|---|---|---|---|
| Resin member | Type of thermoplastic resin | Cyclic olefin resin | | | | | | |
| | Glass transition temperature R [° C.] of thermoplastic resin | 136 | | | | | | |
| Solvent used in coating film formation step | Type | THF | THF | THF | THP | THP | 2-methyl THF | THF |
| | Degree of swelling of thermoplastic resin [—] | 1.56 | 1.56 | 1.56 | 2.15 | 2.15 | 1.76 | 1.56 |
| | Boiling point at 1 atm [° C.] | 65 | 65 | 65 | 88 | 88 | 80.2 | 65 |
| Preheating step | Preheating temperature [° C.] | 30 | 60 | 80 | 80 | 100 | 80 | 90 |
| | Preheating temperature − boiling point of solvent [° C.] | −35 | −5 | +15 | −8 | +12 | −0.2 | +25 |
| Heating and pressing step | Temperature of upper heating plate [° C.] | 30 | 60 | 80 | 80 | 100 | 80 | 90 |
| | Temperature of lower heating plate [° C.] | 30 | 60 | 80 | 80 | 100 | 80 | 90 |
| | Heating temperature H [° C.] | 30 | 60 | 80 | 80 | 100 | 80 | 90 |
| | H − R [° C.] | −106 | −76 | −56 | −56 | −36 | −56 | −46 |
| Evaluation | External appearance defects (cracks, white turbidity) | B Partially cracked | A | A | A | A | A | B Partially cracked |
| | Joining state | A | A | A | A | A | A | A |
| | Deformation state | A | A | A | A | A | A | A |
| | Amount of residual solvent | B | A | A | A | A | A | A |

TABLE 1-continued

|  |  | Example 8 | Example 9 | Comparative Example 1 | Comparative Example 2 | Comparative Example 3 | Comparative Example 4 |
|---|---|---|---|---|---|---|---|
| Resin member | Type of thermoplastic resin | Cyclic olefin resin | | | Cyclic olefin resin | | |
|  | Glass transition temperature R [° C.] of thermoplastic resin | 136 | | | 136 | | |
| Solvent used in coating film formation step | Type | THF | THP | Cyclohexane | Acetone | Hexadecane | Cyclohexanone |
|  | Degree of swelling of thermoplastic resin [—] | 1.56 | 2.15 | Measurement was not made due to melting | 1.00 | 1.05 | 1.00 |
|  | Boiling point at 1 atm [° C.] | 65 | 88 | 80.7 | 56.5 | 287 | 155.7 |
| Preheating step | Preheating temperature [° C.] | 60 | 80 | 80 | 50 | 110 | 140 |
|  | Preheating temperature − boiling point of solvent [° C.] | −5 | −8 | −0.8 | −5.6 | −177 | −15.7 |
| Heating and pressing step | Temperature of upper heating plate [° C.] | 100 | 120 | 80 | 50 | 110 | 140 |
|  | Temperature of lower heating plate [° C.] | 60 | 80 | 80 | 50 | 110 | 140 |
|  | Heating temperature H [° C.] | 100 | 120 | 80 | 50 | 110 | 140 |
|  | H − R [° C.] | −36 | −16 | −56 | −86 | −26 | +4 |
| Evaluation | External appearance defects (cracks, white turbidity) | A | A | C White turbidity | A | A | C Crack |
|  | Joining state | A | A | A | C Joining could not be performed | A | A |
|  | Deformation state | A | B | C | — | A | D |
|  | Amount of residual solvent | A | A | A | — | C | B |

Table 1 and the above description of Examples indicate that the residual solvent in the joined portion when the resin members were joined together was prevented, and also deformation and external appearance defects of the resin members composing the joined article was also prevented by the method of joining resin members including a coating layer formation step where a solvent was used that allows a thermoplastic resin to have a degree of swelling that falls within a predetermined range when the thermoplastic resin is swollen by the solvent and that has a boiling point B° C. that was equal to or lower than the glass transition temperature R° C. of the thermoplastic resin, a lamination step of the laminating resin members one another via the coating layer to form a laminate, and a heating and pressing step of pressing the laminate while heating at a heating temperature H° C. which was equal to or lower than R° C.

On the other hand, it is indicated that, in Comparative Examples 1, 2, and 4, in which solvents were used that failed to allow the thermoplastic resin to satisfy the specified range of the degree of swelling when the thermoplastic resin is swollen by the solvent, and in Comparative Example 3 in which the solvent of which boiling point was higher than the glass transition temperature of the thermoplastic resin, the external appearance defects and deformation in the joined article could not be prevented (Comparative Examples 1 and 4), even the joining could not be performed (Comparative Example 2), or the amount of the residual solvent could be reduced (Comparative Example 3).

INDUSTRIAL APPLICABILITY

According to the present disclosure, it is possible to provide a method of joining resin members which can prevent a solvent from remaining in a joined portion when resin members are joined together and can also prevent deformation and external appearance defects of the resin members composing a joined article.

REFERENCE SIGNS LIST

10 Flow channel substrate
11 Channel
12 Both end portion
20 Lid substrate
21 Through hole

The invention claimed is:

1. A method of joining at least two resin members comprising a thermoplastic resin, the method comprising:
    forming a coating layer by applying a solvent to a surface of at least one of the resin members, the solvent allowing the thermoplastic resin to have a degree of swelling of 1.05 or more and 3.00 or less when the thermoplastic resin is swollen by the solvent, and having a boiling point B° C. of R° C. or lower where R° C. is a glass transition temperature of the thermoplastic resin;
    laminating the at least two resin members to one another via the coating layer to form a laminate; and
    pressing the laminate in the lamination direction while heating at a heating temperature H° C. that is equal to lower than R° C.

2. The method of joining resin members according to claim 1, wherein at least one of the at least two resin members is a transparent resin member.

3. The method of joining resin members according to claim 1, wherein the heating temperature H° C. in the heating and pressing is (R−20° C.) or lower.

4. The method of joining resin members according to claim 1, comprising preheating the laminate at a temperature of (B+25° C.) or lower between the laminating and the heating and pressing.

\* \* \* \* \*